United States Patent [19]

Hirose

[11] Patent Number: 5,695,423
[45] Date of Patent: Dec. 9, 1997

[54] HYDRAULIC CONTROL DEVICE FOR AUTOMATIC TRANSMISSION

[75] Inventor: Ikuo Hirose, Fuji, Japan

[73] Assignee: Jatco Corporation, Japan

[21] Appl. No.: 670,636

[22] Filed: Jun. 26, 1996

[30] Foreign Application Priority Data

Jun. 29, 1995 [JP] Japan .................................. 7-164033

[51] Int. Cl.⁶ .................................................. F16H 61/00
[52] U.S. Cl. .................................................. 475/129
[58] Field of Search ........................... 475/129; 477/152

[56] References Cited

U.S. PATENT DOCUMENTS

| | | | |
|---|---|---|---|
| 4,274,307 | 6/1981 | Iwanaga et al. | 475/129 |
| 4,709,597 | 12/1987 | Yasue et al. | 475/129 |

*Primary Examiner*—Dirk Wright
*Attorney, Agent, or Firm*—Rossi & Associates

[57] ABSTRACT

In a hydraulic control device for an automatic transmission for obtaining the optimum shift-down timing by regulating an accumulator back pressure for an engaging element to be engaged in low-speed gear positions, switch control means is provided for communicating an output oil path communicating with an accumulator back pressure chamber, with a selected one of an accumulator control pressure oil path and a drain oil path. The switch control means maintains communication between the output oil path and the accumulator control pressure oil path due to the output feed-back pressure in the N-speed gear position, and brings the output oil path into communication with the drain oil path, using the N+1 pressure as the operating signal pressure, upon shifting-up from the N-speed to N+1-speed gear position. The switch control means also maintains communication between the output oil path and the drain oil path due to a force other than the N+1 pressure in the N+1-speed gear position, and brings the output oil path into communication with the accumulator control pressure oil path, using only the solenoid pressure as the operating signal pressure, upon shifting-down from the N+1-speed to N-speed gear position.

4 Claims, 13 Drawing Sheets

|  | REV/C | H/C | LOW/C | L&R/B | LOW<br>Q W C | B/B |
|---|---|---|---|---|---|---|
| 1st |  |  | ○ | ◌ | ◉ |  |
| 2nd |  |  | ○ |  |  | ○ |
| 3rd |  | ○ | ○ |  |  |  |
| 4th |  | ○ |  |  |  | ○ |
| REV | ○ |  |  | ○ |  |  |

| GEAR \ SOLENOID | SHIFT SOLENOID A | SHIFT SOLENOID B |
|---|---|---|
| 1st GEAR | ○ | ○ |
| 2nd GEAR | × | ○ |
| 3rd GEAR | × | × |
| 4th GEAR | ○ | × |

○ ---- ON (DRAIN CIRCUIT CLOSED)
× ---- OFF (DRAIN CIRCUIT OPEN)

HYDRAULIC CONTROL DEVICE FOR AUTOMATIC TRANSMISSION

BACKGROUND OF THE INVENTION

1. Field of the Invention

The present invention relates to a hydraulic control device for an automatic transmission, and in particular to a technique for controlling the timing of shift-up and shift-down actions.

2. Description of the Prior Art

As a method for appropriately controlling the shift timing of the transmission upon shifting-down from the 4th-speed to 3rd-speed gear position and thereby to avoid shift shocks, it is known to provide a one-way clutch in a gear train, as disclosed in FIG. 2 of Japanese Patent Application Laid-open No. 5-248526. The use of the one-way clutch, however, requires the gear train to further include a clutch which is hydraulically engaged for ensuring the effect of engine braking, resulting in undesirably increased size, weight and cost of the transmission.

In view of the above, Japanese Patent Application Laid-open No. 5-248526 discloses in FIG. 5 a hydraulic control device for appropriately controlling the timing of the shift-down action from the 4th-speed to 3rd-speed gear position, without using the one-way clutch. The operation of this device upon shifting-down from the 4th-speed to 3rd-speed gear position will be explained. Immediately after switching of a shift valve, a 4A pressure (91) is drained through the shift valve. While an oil in a 4A accumulator is discharged, however, a circuit (92) communicates with a circuit (89) since the 4A pressure is kept at a steady-state level for a given period of time. As a timing valve (87) is shifted by a solenoid (60) in a direction in which a spring is contracted, the circuit (92) is kept drained. Although a low clutch pressure is generated by the shift valve (52), this pressure does not fill the capacity of a low clutch due to a low accumulator pressure, whereby a band brake may slip due to the 4A pressure, causing racing of the engine. When the gear ratio of input and output shafts of the transmission becomes equal to that of the 3rd-speed gear position after a while, the A/T control unit detects the 3rd-speed gear ratio, and switches the solenoid (60) so that an accumulator back pressure (88) is applied to the circuit (92), so as to produce the capacity of the low clutch.

In the above-described known hydraulic control device, however, if the 4A pressure kept at the steady-state level is not sufficiently high or the steady-state period does not last long due to the absence (or small size) of the 4A accumulator, the position of a low clutch sequence valve (90) is changed in an early period of the shift-down operation from the 4th-speed to 3rd-speed gear position, and the accumulator back pressure is applied to the circuit (92) before the A/T control unit detects the 3rd-speed gear ratio. In this case, the 4th-speed to 3rd-speed shift-down action takes place in an untimely manner. Thus, in the known device in which the 4A pressure is used as an operating signal pressure for the 4th-speed to 3rd-speed shift-down action, the 4A accumulator cannot be eliminated or reduced in size.

SUMMARY OF THE INVENTION

It is therefore an object of the present invention to provide a hydraulic control device for an automatic transmission for appropriately controlling the shift-down timing by regulating an accumulator back pressure for an engaging element to be engaged in low-speed gear positions, wherein an optimum shift-down timing can be achieved, and an accumulator for an engaging element to be engaged in a high-speed gear position can be eliminated or reduced in size.

The above object may be accomplished according to the principle of the present invention, which provides a hydraulic control device for an automatic transmission for appropriately controlling the shift-down timing by regulating an accumulator back pressure for an engaging element to be engaged in low-speed gear positions, which control device includes switch control means for communicating an output oil path communicating with a back pressure chamber of an accumulator with a selected one of an accumulator control pressure oil path and a drain oil path. The switch control means maintains communication between the output oil path and the accumulator control pressure oil path due to the output feed-back pressure in the N-speed gear position, and brings the output oil path into communication with the drain oil path, using the N+1 pressure as the operating signal pressure, upon shifting-up from the N-speed to N+1-speed gear position. The switch control means also maintains communication between the output oil path and the drain oil path due to a force other than the N+1 pressure in the N+1-speed gear position, and brings the output oil path into communication with the accumulator control pressure oil path, using only the solenoid pressure as the operating signal pressure, upon shifting-down from the N+1-speed to N-speed gear position. In this arrangement, the optimum shift-down timing can be achieved, and an accumulator for an engaging element to be engaged in a high-speed gear position can be eliminated or reduced in size.

The switch control means may include an engaging element timing valve which operates in response to the solenoid pressure as the operating signal pressure, and an engaging element sequence valve to which the output feed-back pressure is applied. In this arrangement, a valve operating signal pressure (such as an N+1 pressure or D range pressure other than the N+1 pressure) of the engaging element sequence valve may be switched by the engaging element timing valve.

If the engaging element sequence valve is constructed such that its input pressure is switched or changed by the engaging element timing valve, the output oil path can be connected to a selected one of the accumulator control pressure oil path and the drain oil path, by switching or changing the input pressure of the engaging element sequence valve by means of the engaging element timing valve.

If the engaging element sequence valve is constructed such that its output pressure is switched or changed by the engaging element timing valve, the output oil path can be connected to a selected one of the accumulator control pressure oil path and the drain oil path, by switching or changing the output pressure of the engaging element sequence valve by means of the engaging element timing valve.

BRIEF DESCRIPTION OF THE DRAWINGS

The invention will be described in greater detail with reference to certain preferred embodiments thereof and the accompanying drawings, wherein.

DETAILED DESCRIPTION OF THE PREFERRED EMBODIMENT

Figure 1:
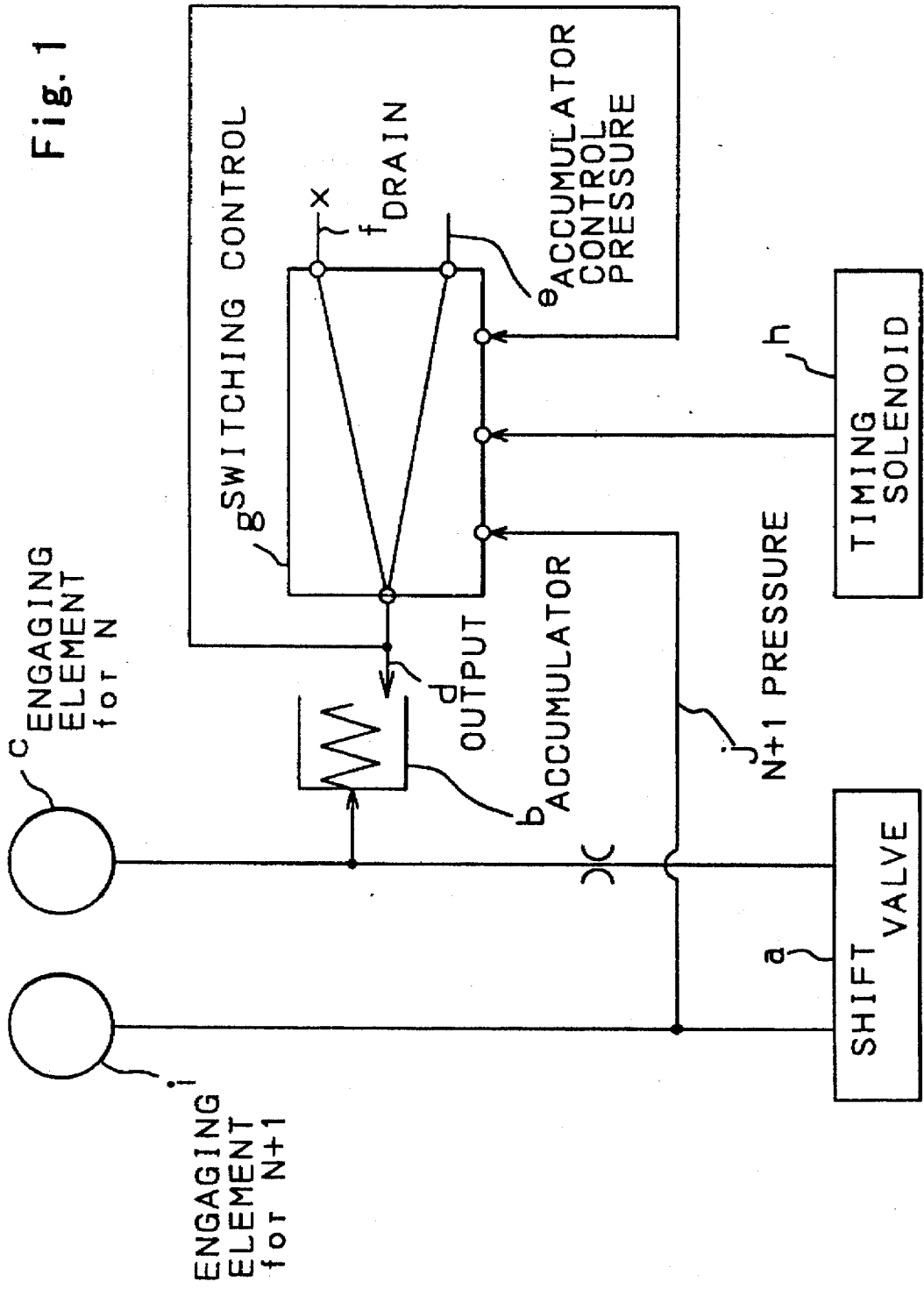
FIG. 1 is a view showing common features of a structure of a hydraulic control device for an automatic transmission according to the present invention.

FIG. 1 shows common features of a hydraulic control device of each of preferred embodiments of the present invention which will be hereinafter described.

The hydraulic control device for an automatic transmission includes an N-speed gear engaging element c that is engaged in an N-speed gear position and released in an N+1-speed gear position, an accumulator b disposed in the middle of an oil path that communicates the N-speed gear engaging element c with a shift valve a, an output oil path d communicating with a back pressure chamber of this accumulator b, switch control means g for connecting the output oil path communicating with the back pressure chamber of the accumulator b to a selected one of an accumulator control pressure oil path e and a drain oil path f, a timing solenoid h for guiding a regulated solenoid pressure as an operating signal pressure to the switch control means g, synchronously with the engaging timing of the N-speed gear engaging element c upon shifting-down from the N+1-speed gear position to the N-speed gear position, and an N+1-speed pressure oil path j for guiding an oil pressure applied to an N+1-speed gear engaging element i which is engaged in an N+1-speed gear position to the switch control means g as an operating signal pressure.

An output feed-back pressure from the output oil path d, in addition to the above-indicated solenoid pressure and N+1-speed pressure, can be selectively applied to the switch control means g as an operating signal pressure. More specifically, in the N-speed gear position, the switch control means g keeps the accumulator control pressure oil path e in communication with the output oil path d, due to the output feed-back pressure. Upon shifting-up from the N-speed to N+1-speed gear position, the N+1 pressure is used as the operating signal pressure, so that the drain oil path f is brought into communication with the output oil path d.

In the N+1-speed gear position, the communication of the output oil path d with the drain oil path f is maintained by the force other than the N+1 pressure, and, upon shifting-down from the N+1-speed to N-speed gear position, only the solenoid pressure is used as the operating signal pressure, so as to connect the output oil path d to the accumulator control pressure oil path e.

In the N-speed gear position, the output feed back pressure developed in the output oil path d is applied as an operating signal pressure to the switch control means g, so as to maintain communication between the output oil path d and the accumulator control pressure oil path e. In this gear position, the N+1-speed gear engaging element i is released, and no N+1 pressure is produced.

When the transmission is shifted up from the N-speed to N+1-speed gear position, the N+1 pressure to be applied to the N+1-speed gear engaging element i is applied as an operating signal pressure to the switch control means g, for switching the communication of the output oil path d with the accumulator control pressure oil path e to that with the drain oil path f when the N+1 pressure reaches a predetermined level with the lapse of time. The N-speed gear engaging element c is released due to the switching, and the N+1-speed gear engaging element i is then engaged due to the increase in the N+1 pressure.

In the N+1-speed gear position, the force other than the N+1 pressure is applied to the switch control means g, so that the communication between the output oil path d and the drain oil path f is maintained. In this state, the N-speed gear engaging element c is released, and no output feed-back pressure is produced.

When the transmission is shifted down from N+1-speed to N-speed gear position, only the solenoid pressure is applied as an operating signal pressure to the switch control means g, so as to switch the communication of the output oil path d with the drain oil path f to that with the accumulator control pressure oil path e at the same time that the solenoid pressure is generated. Thus, the N-speed gear engaging element c is engaged due to the switching of the oil path, and the N+1-speed engaging element i is released due to reduction of the N+1 pressure.

As is understood from the above, the timing of the shift-up action is controlled by the N+1 pressure. This is because the shift-up action may be timed by means of an engaging capacity, that is, a pressure.

On the other hand, the shift-down action cannot be timed with the engaging capacity, and must be timed by means of rotation or change gear ratio. Accordingly, the solenoid pressure is used, for example, so that the signal pressure is generated when the change gear ratio becomes equal to a predetermined value.

As described above, the switch control means g uses the force other than the N+1 pressure as the operating signal pressure in the N+1-speed gear position before the shift-down action, and uses only the solenoid pressure as the operating signal pressure during the shift-down action, while using the output feed-back pressure as the operating signal pressure in the N-speed gear position after the shift-down action. Thus, the N+1 pressure is not used except for the shift-up action as described above. Therefore, an appropriate timing of the shift-down action can be achieved without having any relation with the N+1 pressure. Since the shift-down action is not influenced by the N+1 pressure, an accumulator for the N+1-speed gear engaging element i can be eliminated or reduced in size.

Figures 2, 3:
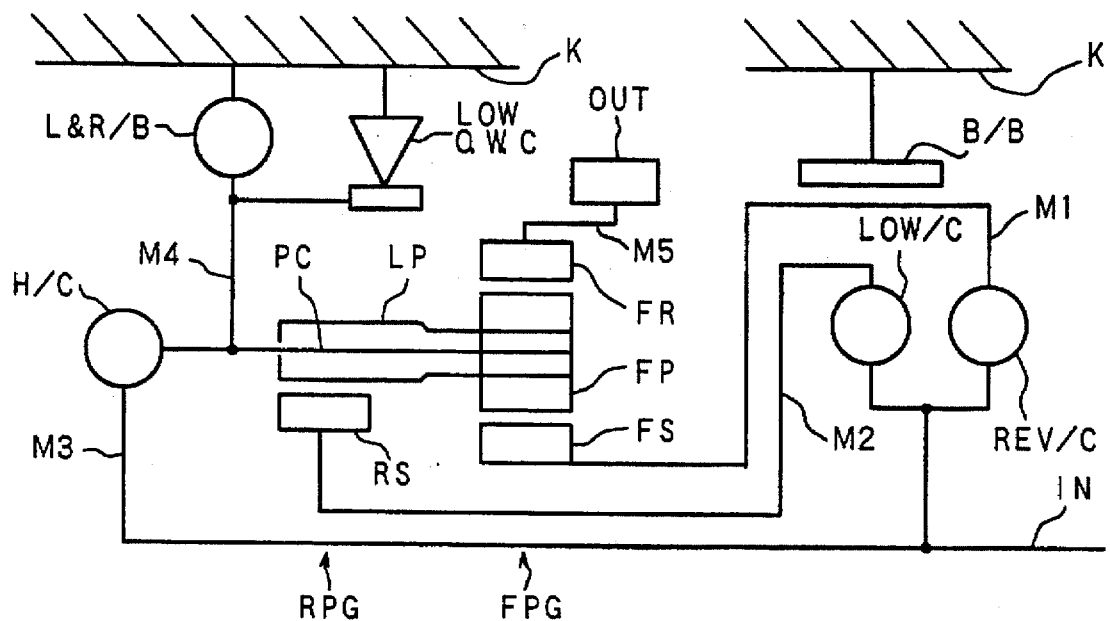
FIG. 2 is a schematic view showing a power transmitting system of an automatic transmission using the hydraulic control device as the first embodiment of the invention.
FIG. 3 is a view showing engaged states of elements of the automatic transmission using the hydraulic control device of the first embodiment.

The hydraulic control device according to the present invention is used to control a power transmitting system of the automatic transmission as shown in FIG. 2. In FIG. 2, IN is an input shaft, and OUT is an output gear, while FPG is a front planetary gear, and RPG is a rear planetary gear. The front planetary gear FPG includes a front sun gear FS, a front ring gear FR, and a front pinion FP that is engageable with both of the gears FS, FR. The rear planetary gear RPG includes a rear sun gear RS, and a long pinion LP that is engageable with the gear RS and also with the front pinion FP. The front pinion FP and the long pinion LP are both supported by a common carrier PC.

In the above-described gear train arrangement, four members, i.e., front sun gear FS, rear sun gear RS, common carrier PC, and front ring gear FR, are involved with a shifting action of the transmission. Further, there are provided a reverse clutch REV/C, high clutch H/C, low clutch LOW/C, low & reverse brake L&R/B, low one-way clutch LOW O.W.C, and band brake B/B, which serve as shifting elements for connecting a selected one or ones of the above four members to the input shaft IN or fixing the selected member(s) to a case K, so as to establish forward 4-speed, reverse 1-speed gear positions.

The front sun gear FS is connected to the input shaft IN through a first rotary member M1 and the reverse clutch REV/C, and also connected to the case K through the first rotary member M1 and the band brake B/B. The rear sun gear RS is connected to the input shaft IN through a second rotary member M2 and the low clutch LOW/C. The common carrier PC is connected to the input shaft IN through the high clutch H/C and a third rotary member M3, and is also connected to the case K through a fourth rotary member M4, and the low & reverse brake L&R/B and low one-way clutch LOW O.W.C connected in parallel with each other. The front ring gear FR is connected to the output gear OUT through a fifth rotary member M5.

This power transmitting system is characterized in that it does not include a one-way clutch for controlling the shift timing so as to eliminate shift shocks upon shifting-down from 4-speed to 3-speed gear position, and a clutch that is engaged due to oil pressure and needed for ensuring the effect of engine braking when the above one-way clutch is employed. Thus, the number of shifting elements is reduced, leading to reduced size and weight of the power transmitting system.

FIG. 3 is a view showing engaged states of the shifting elements of the above-described power transmitting system for establishing the forward 4-speed, reverse 1-speed gear positions.

The 1st-speed gear position is established by hydraulically engaging the low clutch LOW/C, and hydraulically engaging the low & reverse brake L&R/B (when an engine brake range is selected) or mechanically engaging the low one-way clutch LOW O.W.C (when the vehicle is accelerated). In this case, the rear sun gear RS is connected to the input shaft IN, and the common carrier PC is fixed, while the front ring gear FR is connected to the output gear OUT.

The 2nd-speed gear position is established by hydraulically engaging the low clutch LOW/C and the band brake B/B. In this case, the rear sun gear RS is connected to the input shaft IN, and the front sun gear FS is fixed, while the front ring gear FR is connected to the output gear OUT.

The 3rd-speed gear position is established by hydraulically engaging the high clutch H/C and the low clutch LOW/C. In this case, the rear sun gear RS and common carrier PS are concurrently connected to the input shaft IN, and the front ring gear FR is connected to the output gear OUT, so that the transmission gear ratio becomes equal to 1.

The 4th-speed gear position is established by hydraulically engaging the high clutch H/C and the band brake B/B. In this case, the common carrier PC is connected to the input shaft IN, and the front sun gear FS is fixed, while the front ring gear FR is connected to the output gear OUT, so as to establish the overdrive gear position.

The reverse gear position is established by hydraulically engaging the reverse clutch REV/C and the low & reverse brake L&R/B. In this case, the front sun gear FS is connected to the input shaft IN, the common carrier PS is fixed, while the front ring gear FR is connected to the output gear OUT.

Figure 4A:
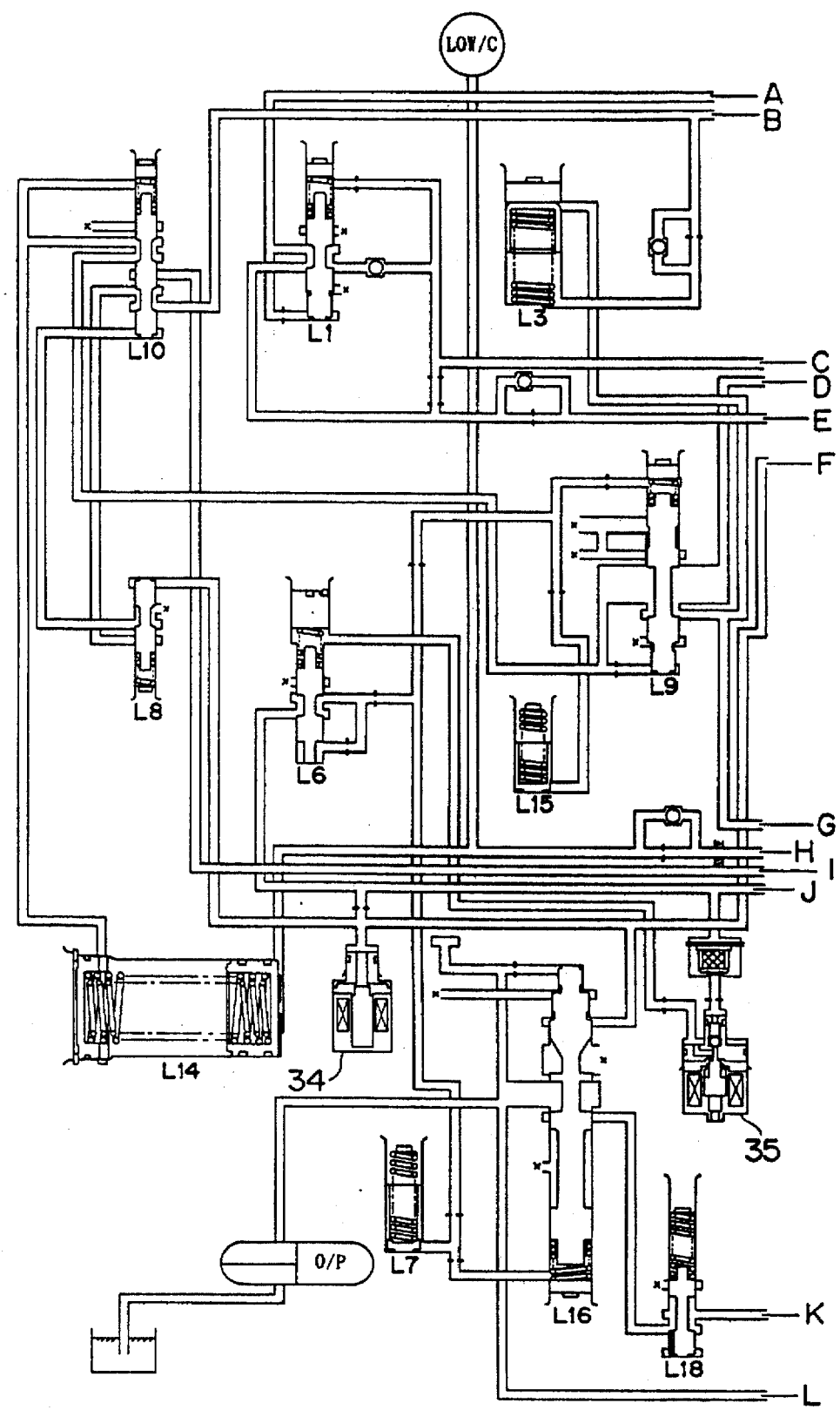
FIGS. 4A and 4B are views showing a hydraulic circuit of the whole control valve system that is the hydraulic control device of the first embodiment.
Figure 4B:
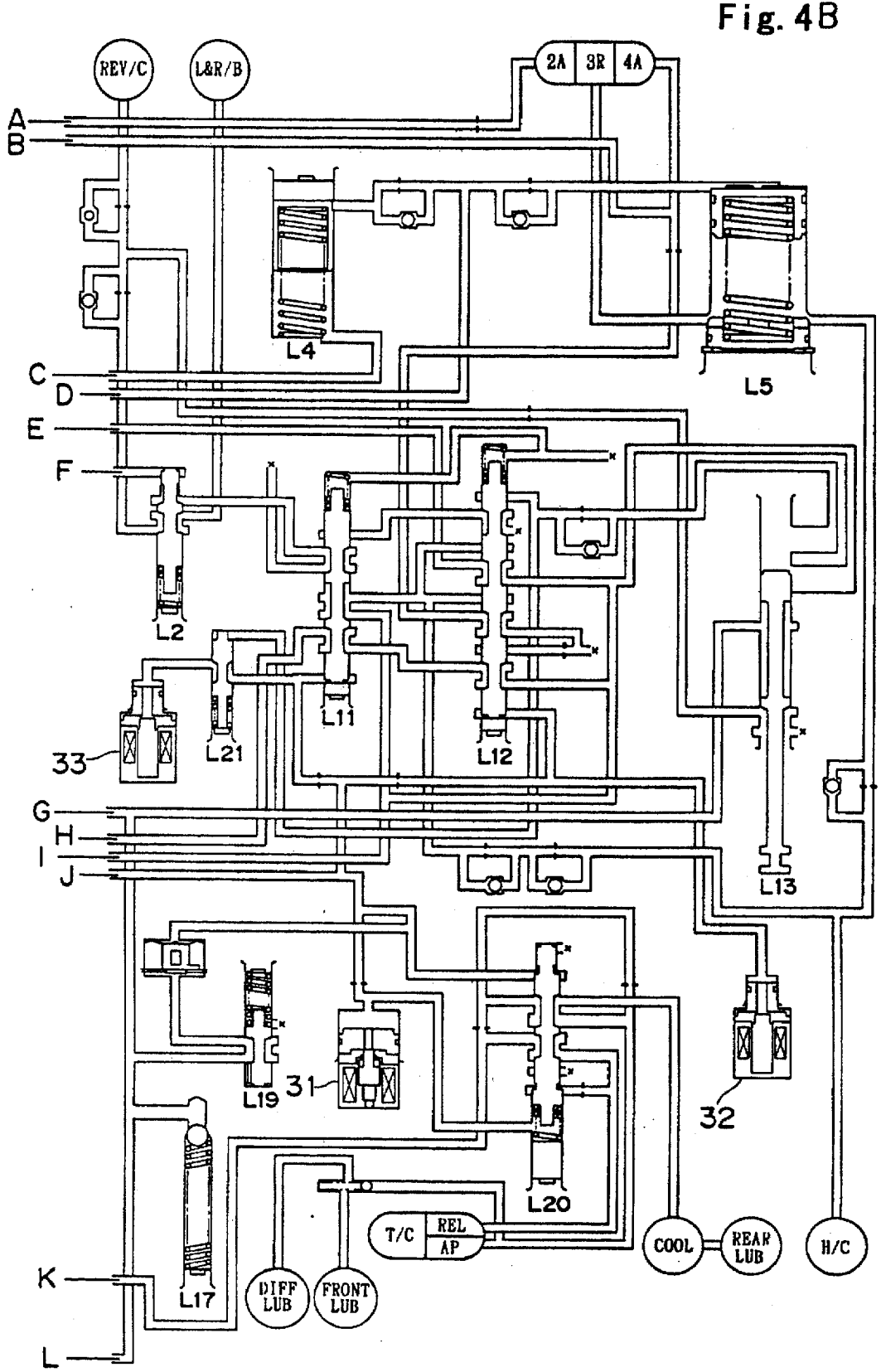

FIGS. 4A and 4B are hydraulic circuit diagrams showing the whole control valve system including the reverse inhibit valve as described above. In FIGS. 4A and 4B, L16 is a pressure regulator valve for controlling a pressure discharged from an oil pump to a line pressure depending upon the level of a pressure modifier pressure. L6 is a pressure modifier valve for reducing a pilot pressure depending upon the level of a throttle pressure, to prepare the pressure modifier pressure. L19 is a pilot valve for reducing the line pressure to prepare the pilot pressure as a constant pressure. L9 is an accumulator control valve for reducing the line pressure depending upon the level of the pressure modifier pressure, to prepare an accumulator control pressure. L18 is a torque converter pressure regulator valve for reducing the line pressure to prepare a torque converter pressure. L17 is a line pressure relief valve for defining the upper limit of the line pressure.

L12 and L11 are shift valve A and shift valve B, respectively, which effect switching of oil paths to establish each of the 1st-speed to 4th-speed (overdrive) gear positions according to the operation of shift solenoids. L20 is a lock-up control valve for selectively engaging and releasing a lock-up clutch according to the operation of a lock-up solenoid. This valve L20 also functions as a pressure-controlling valve during switching from an engaged state of the lock-up clutch to its released state and vice versa. L2 is a reverse inhibit valve for changing a circuit for applying the line pressure to the low & reverse brake according to the operation of a timing solenoid. L13 is a manual valve for delivering the line pressure to an appropriate control valve or valves according to a selected position of a select lever. L21 is a 2nd-speed hold valve for achieving a 2nd-speed gear ratio by placing the select lever in the 1-range, in case of failure of an electronic control system.

L10 and L8 are low clutch sequence valve and low clutch timing valve, respectively, for appropriately controlling the timing of engaging and releasing the low clutch upon shifting-up to the 4th-speed gear position or shifting-down from the 4th-speed gear position. L14 is a low-clutch accumulator for smoothly engaging the low clutch and also appropriately controlling the timing of engaging and releasing the low clutch. L1 and L4 are 1-2 modulator valve and 1-2 accumulator piston, respectively, which serve to smoothly engage the brake band upon shifting from the 1st-speed gear position to the 2nd-speed gear position. L5 is a 2-3 accumulator for smoothly engaging the high clutch and releasing the brake band upon shifting from the 2nd-speed gear position to the 3rd-speed gear position. L3 is a 3-4 accumulator for smoothly engaging the brake band upon shifting from the 3rd-speed gear position to the 4th-speed gear position. L15 and L7 are modifier accumulator and line-pressure accumulator, respectively, for preventing pulsation of the pressure modifier pressure and thus leveling this pressure.

In FIGS. 4A and 4B, 31 is the lock-up solenoid, 32 is a shift solenoid A, 33 is a shift solenoid B, 34 is the timing solenoid, 35 is a line-pressure solenoid, O/P is the oil pump, and T/C is the torque converter. Of the above-indicated solenoids, the lock-up solenoid 31 and line-pressure solenoid 35 are duty solenoids, and the shift solenoid A (32), shift solenoid B (33) and timing solenoid 34 are on-off solenoids. The lock-up clutch is incorporated in the torque converter T/C.

In the upper right portion of FIG. 4B, 2A is a 2nd-speed engaging pressure chamber of a band servo piston for operating the band brake B/B, 3R is a 3rd-speed releasing pressure chamber, and 4A is a 4th-speed engaging pressure chamber. The band brake B/B is engaged due to the hydraulic operation of the pressure chamber 2A only, and released due to the hydraulic operation of the pressure chambers 2A and 3R. The band brake B/B is also engaged due to the hydraulic operation of the pressure chambers 2A, 3R and 4A.

Figure 5:
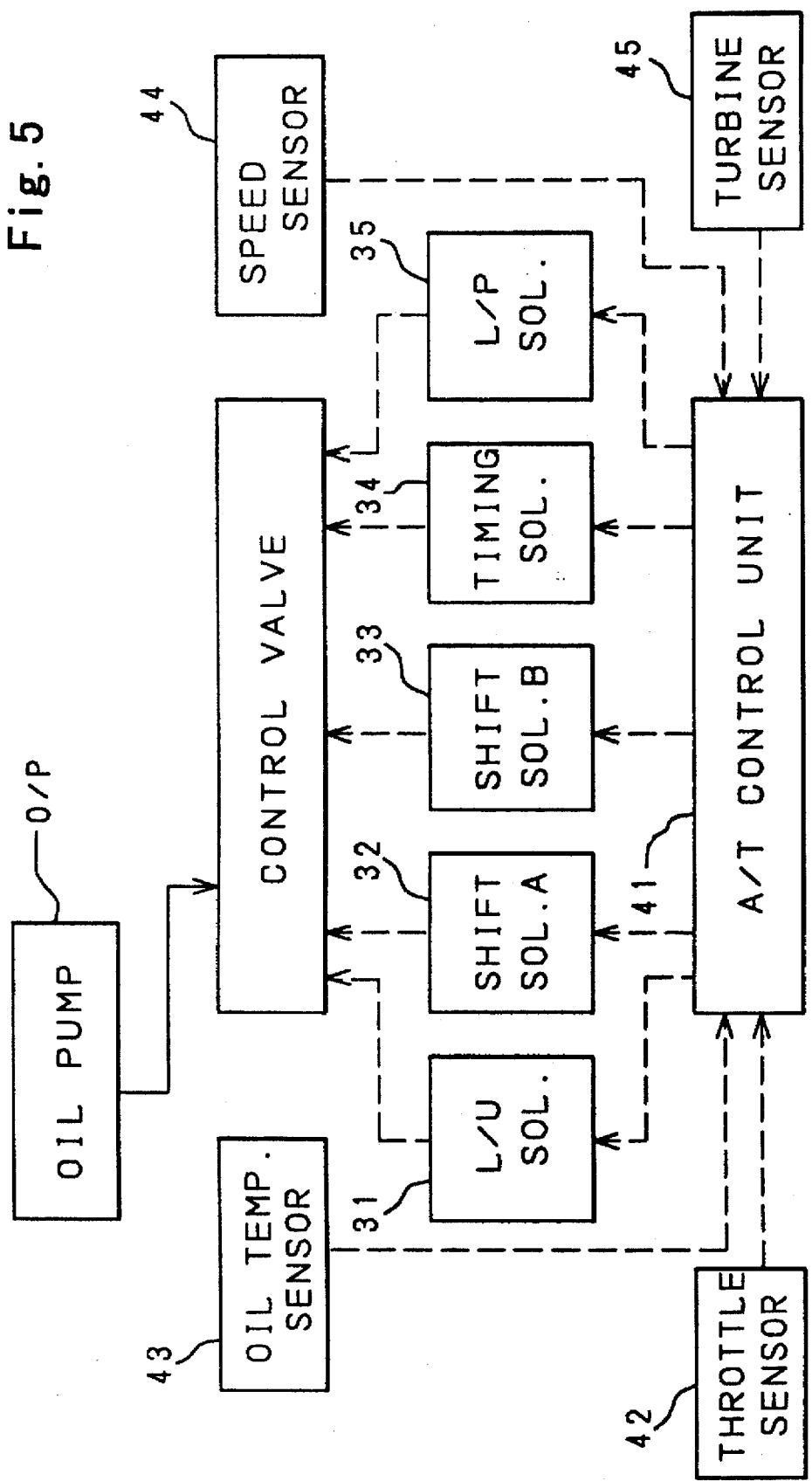
FIG. 5 is a block diagram of an electronic control system for the device of the first embodiment.

FIG. 5 is a block diagram of an electronic control system for controlling the above hydraulic control device. The above-indicated solenoids 31, 32, 33, 34 and 35 are driven or controlled by an A/T control unit 41. This A/T control unit 41 receives signals from various sensors, such as a throttle sensor 42, oil temperature sensor 43, vehicle speed sensor 44, and turbine sensor 45, and various switches. The A/T control unit 41 effects arithmetic processing on the basis of input information obtained from detected signals, and predetermined control rules.

Figures 6, 7:
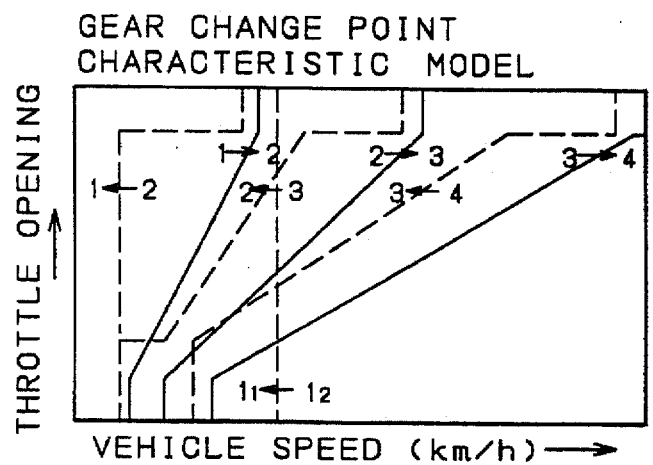
FIG. 6 is a view showing a table of operated states of shift solenoids of the control device of the first embodiment.
FIG. 7 is a view showing one example of characteristics of gear change points at which the transmission is shifted from one gear position to another.

FIG. 6 is a view showing a table of operated states of the shift solenoids A, B, and FIG. 7 is a view showing one example of gear change points at which the transmission gear ratio is changed.

The shift control by means of the shift solenoid A (32) and shift solenoid B (33) is effected by determining an appropriate gear position, on the basis of the gear change points as shown in FIG. 7 and detected throttle position (opening degree) and vehicle speed, and giving commands as to whether the solenoids 32, 33 are turned on or off according to the table of the operated states of the shift solenoids as shown in FIG. 6.

Figure 8:
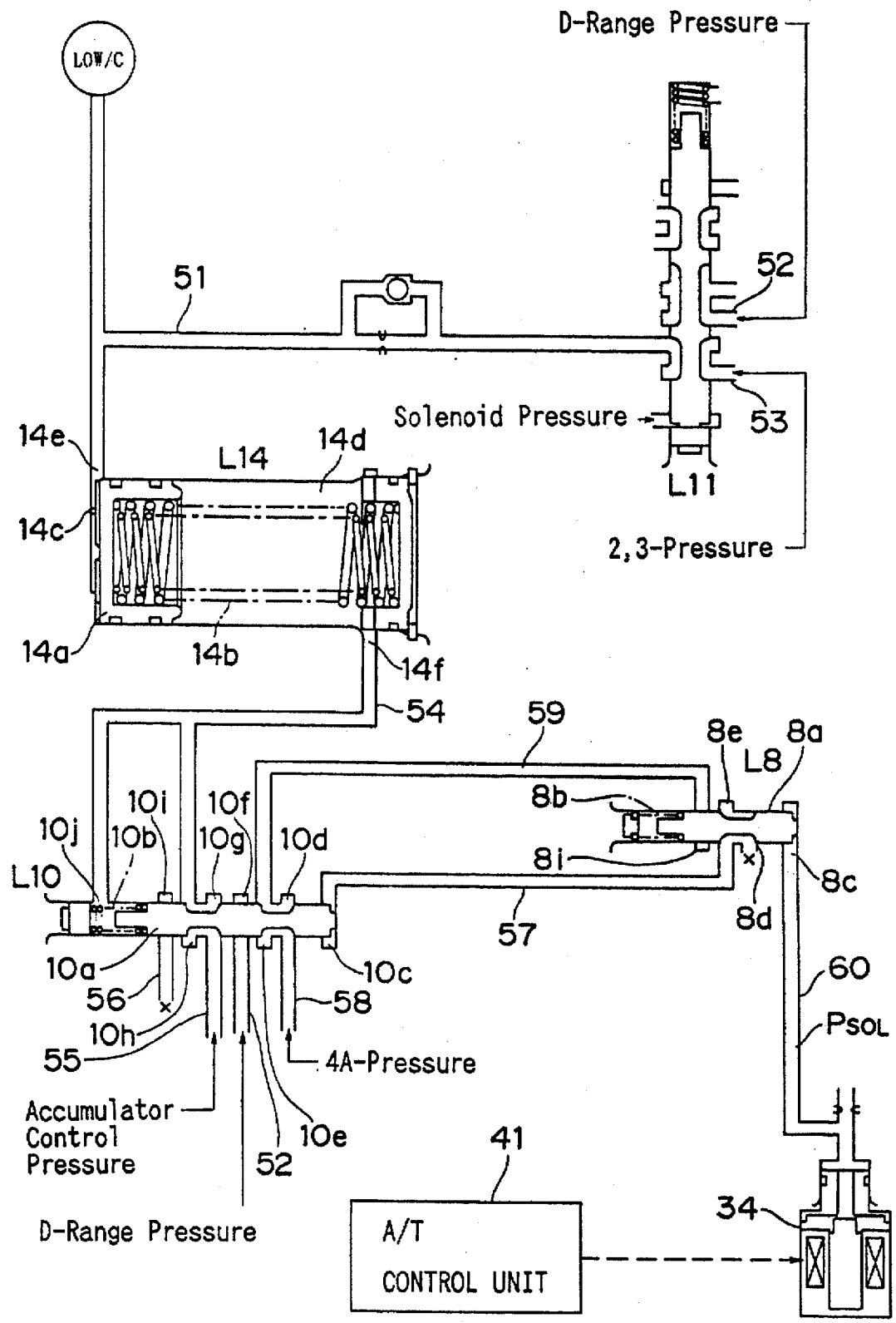
FIG. 8 is a view showing a hydraulic circuit of a principal part of the hydraulic control device of the first embodiment.
Figure 9:
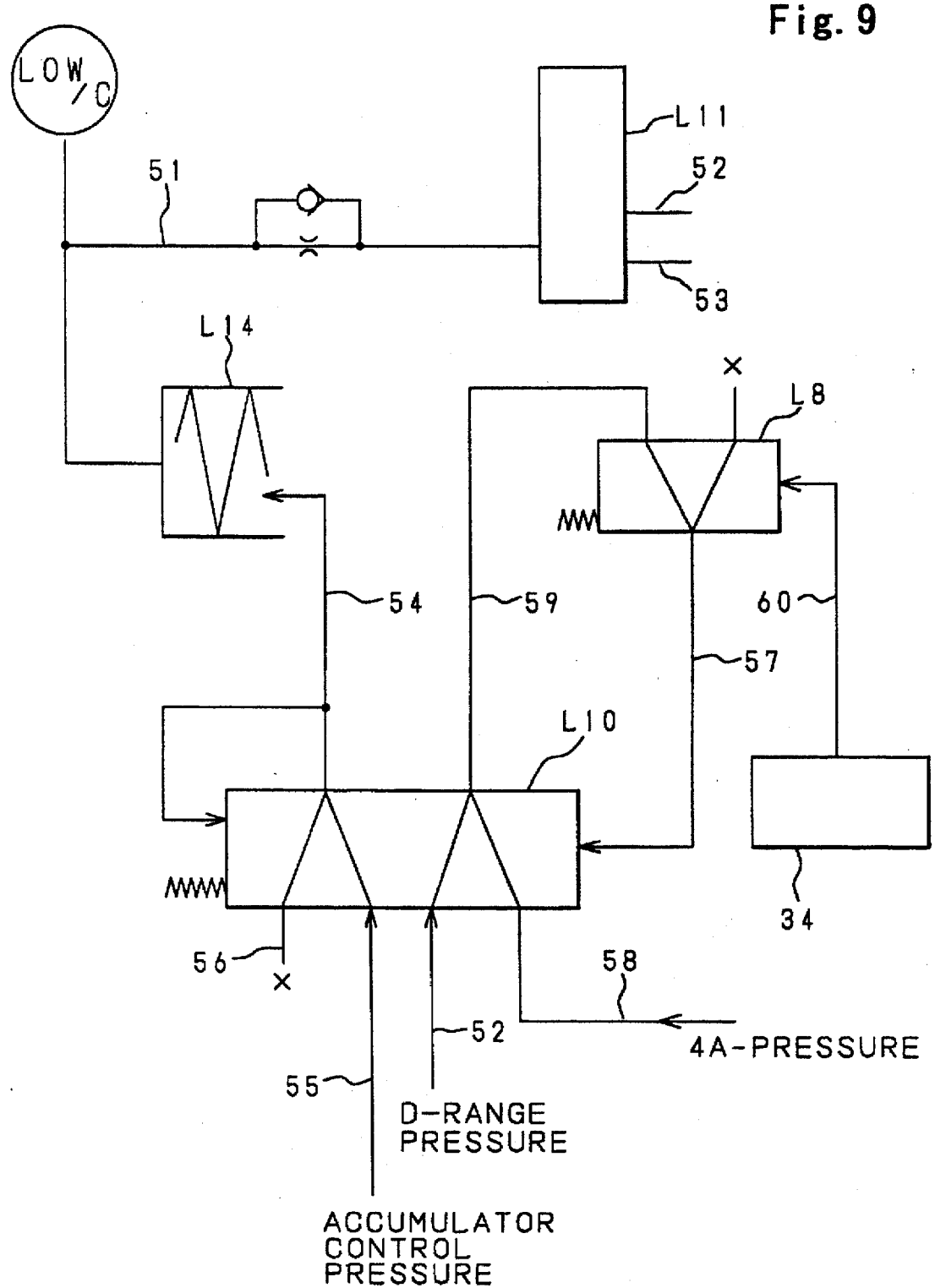
FIG. 9 is a hydraulic circuit diagram showing the principal part of the device of the first embodiment.

FIG. 8 is a hydraulic circuit diagram showing a principal part of the first embodiment of the hydraulic control device of the present invention. FIG. 9 is a diagram schematically showing the principal part of the device.

In these figures, LOW/C is the low clutch (corresponding to the N-speed gear engaging element c), L11 is the shift valve B (corresponding to the shift valve a), L14 is the low clutch accumulator (corresponding to the accumulator b), L8 is the low clutch timing valve (corresponding to an engaging element timing valve), L10 is the low clutch sequence valve (corresponding to an engaging element sequence valve), 34 is the timing solenoid, and 41 is the A/T control unit. The combination of the low-clutch timing valve L8 and low clutch sequence valve L10 corresponds to the switch control means g.

The low clutch accumulator L14 is disposed in the middle of a low clutch pressure oil path 51 extending from the shift valve B (L11) to the low clutch LOW/C. This clutch LOW/C is engaged in the 1st-, 2nd- and 3rd-speed gear positions of the drive range, and is released in the 4th-speed gear position.

The shift valve B (L11) is a switch valve using a solenoid pressure from the shift solenoid B as an operating signal pressure. In this shift valve B, a D range pressure oil path 52 communicates with the low clutch pressure oil path 51 in the 1st-speed or 2nd-speed gear position, and a 2nd-, 3rd-speed generating pressure oil path 53 communicates with the low clutch pressure oil path 51 in the 3rd-speed or 4th speed gear position. In the 1st-speed, 2nd-speed or 3rd-speed gear position of the D (drive) range, the line pressure is supplied to the low clutch pressure oil path 51. In the 4th-speed gear position of the D (drive) range, the oil in the low clutch pressure oil path 51 is drained through the shift valve A (L12). The low clutch accumulator L14 includes a piston 14a, return spring 14b, accumulator pressure chamber 14c and accumulator back pressure chamber 14d. A port 14e communicating with the accumulator pressure chamber 14c is connected to the low clutch pressure oil path 51, and a port 14f communicating with the accumulator back pressure chamber 14d is connected to an accumulator back pressure oil path 54 (corresponding to the output oil path d).

The low clutch sequence valve L10 serves to communicate the accumulator back pressure oil path 54 communicating with the accumulator back pressure chamber 14d, with a selected one of the accumulator control pressure oil path 55 and the drain oil path 56. This valve L10 has a spool 10a slidably inserted through a valve hole, a spring 10b for biasing the spool 10a to the right in FIG. 8, a signal pressure port 10c, 4A pressure port 10d, switch pressure port 10e, D range pressure port 10f, accumulator control pressure port 10g, accumulator back pressure port 10h, drain port 10i and feed-back pressure port 10j, which are formed in the valve hole.

The signal pressure port 10c is connected to a signal pressure oil path 57 extending from the low clutch timing valve L8. The 4A pressure port 10d is connected to a 4A pressure oil path 58 (N+1 pressure oil path) guiding a 4A pressure (4-speed servo apply pressure), which is supplied to a band servo of the band brake B/B (corresponding to the N+1-speed gear engaging element) that is engaged in the 4th-speed gear position.

The switch pressure port 10e is connected to a switch pressure oil path 59 leading to the low clutch timing valve L8. The low clutch timing valve L8 is operated or switched using the solenoid pressure as the operating signal pressure, and includes a spool 8a slidably inserted through a valve hole, a spring 8b for biasing the spool 8a to the right in FIG. 8, a solenoid pressure port 8c, drain port 8d, signal pressure port 8e, and switch pressure port 8f, which are formed along the valve hole.

The solenoid pressure port 8c is connected to a solenoid oil path 60 for draining a solenoid pressure $P_{SOL}$ that is generated at the same time that the low clutch LOW/C is engaged upon shifting-down from the 4th-speed to 3rd-speed gear position.

The timing solenoid 34 is of a type which generates the solenoid pressure $P_{SOL}$ when it is energized or turned ON, and drains the solenoid pressure $P_{SOL}$ when it is not energized or turned OFF. This solenoid 34 is driven in a controlled manner by the A/T control unit 41.

The operation of the hydraulic control device of the first embodiment will be explained.

Figure 10:
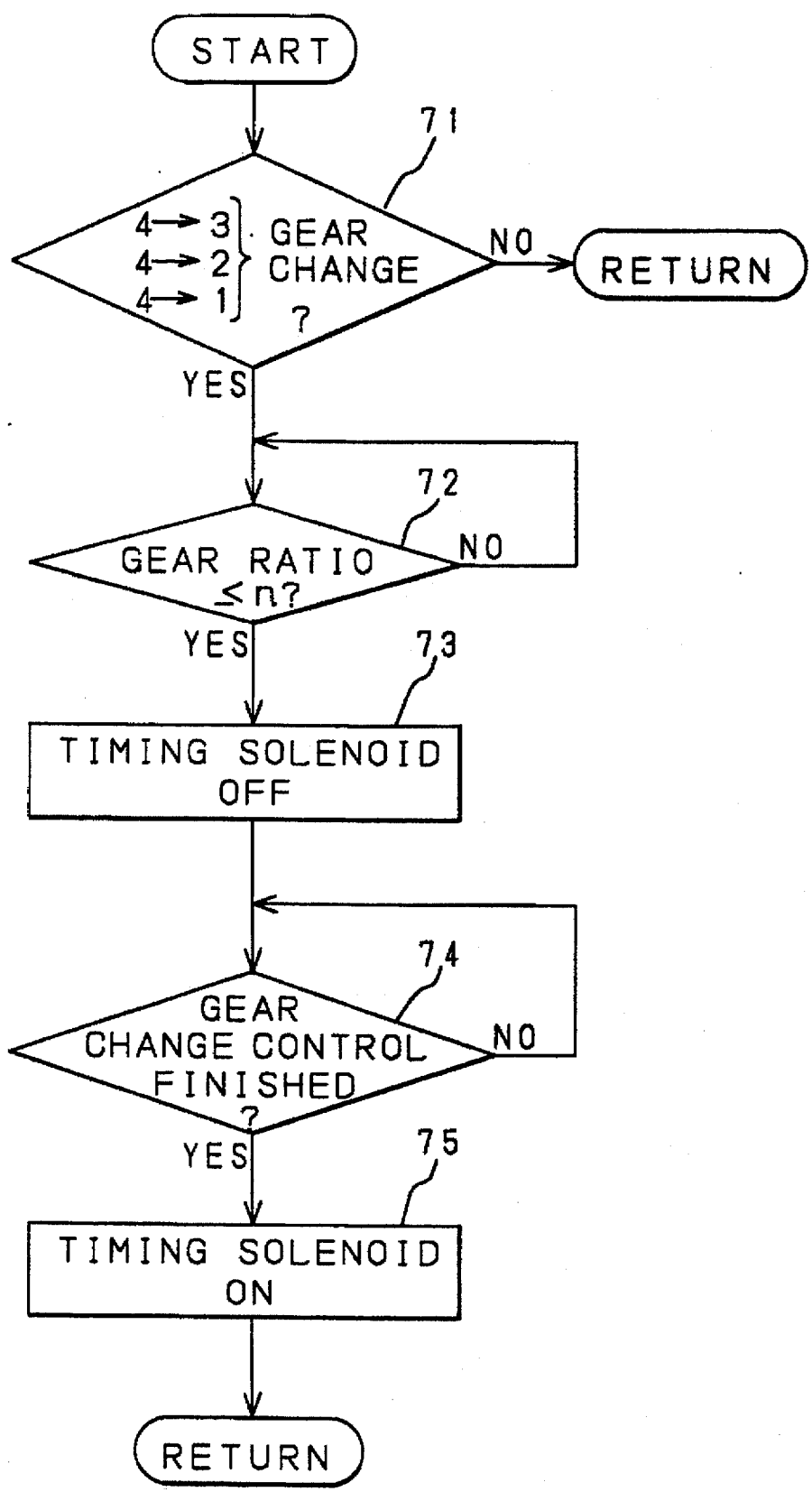
FIG. 10 is a flow chart showing the flow of a shift-down timing control operation implemented by an A/T control unit of the hydraulic control device of the first embodiment.

FIG. 10 is a flow chart showing the flow of a shift-down timing control operation implemented by the A/T control unit 41. In the following, each step of the control flow will be explained.

In step 71, it is determined whether the transmission is shifted from the 4th-speed to 3rd-speed gear position, or from the 4th-speed to 2nd-speed gear position, or from the 4th-speed to 1st-speed gear position.

In step 72, it is determined whether the change gear ratio is equal to or smaller than a predetermined value n. In this step, the change gear ratio is calculated as a ratio of a vehicle speed (rotational frequency of the transmission output shaft) to a turbine speed (rotational frequency of the transmission input shaft). The predetermined value is determined as a value for obtaining an optimum timing in advance. For instance, the predetermined value is around 0.85 when the change gear ratio is 1 in the 4th-speed gear position, and 0.7 in the 3rd-speed gear position.

Immediately after an affirmative decision is obtained in step 72, step 73 is executed to generate a command to turn off the timing solenoid 43. In step 74, it is determined whether the control during the shift-down action is terminated or not. An affirmative decision is obtained when the gear ratio becomes equal to that of the gear position to be established after the shift-down action, or when a predetermined period of time elapses from the beginning of the control. If an affirmative decision is obtained in step 74, step 75 is executed to generate a command to turn on the timing solenoid 43.

Figure 11:
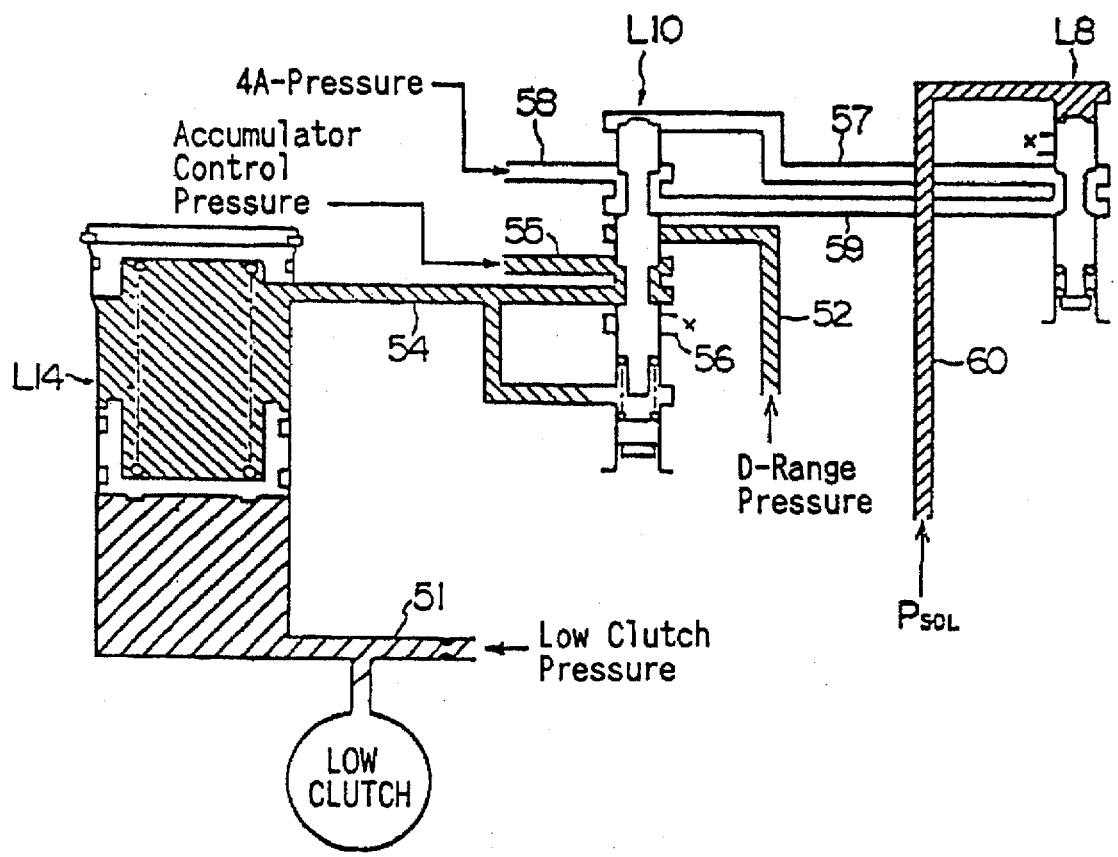
FIG. 11 is a view explaining an operation of the hydraulic control device of the first embodiment when a 3rd-speed gear position is established.

FIG. 11 is a view explaining the operation of the present hydraulic control device when the 3rd-speed gear position is established. A hatched portion in this figure indicates that an oil pressure is generated.

When the transmission is placed in the 3rd-speed gear position, the low clutch LOW/C is engaged, and the accumulator back pressure is supplied to the back pressure chamber 14d of the low clutch accumulator L14. Accordingly, the feed-back pressure of the accumulator back pressure is applied as an operating signal pressure to the low clutch sequence valve L10, so that the spool 10a is fixed at the upper-end stroke position (in FIG. 11), due to the force of the feed-back pressure. As a result, the accumulator back pressure oil path 54 is kept in communication with the accumulator control pressure oil path 55.

Even if the D (drive) range pressure is generated in the 3rd-speed gear position, the band brake B/B as the 4th-speed gear engaging element is released, and the 4A pressure is not generated.

In the 3rd-speed gear position, the solenoid pressure $P_{SOL}$ is generated so that the spool 8a of the low clutch timing valve L8 is fixed at a stroke position for communicating the signal pressure oil path 57 with the switch pressure oil path 59.

Figure 12:
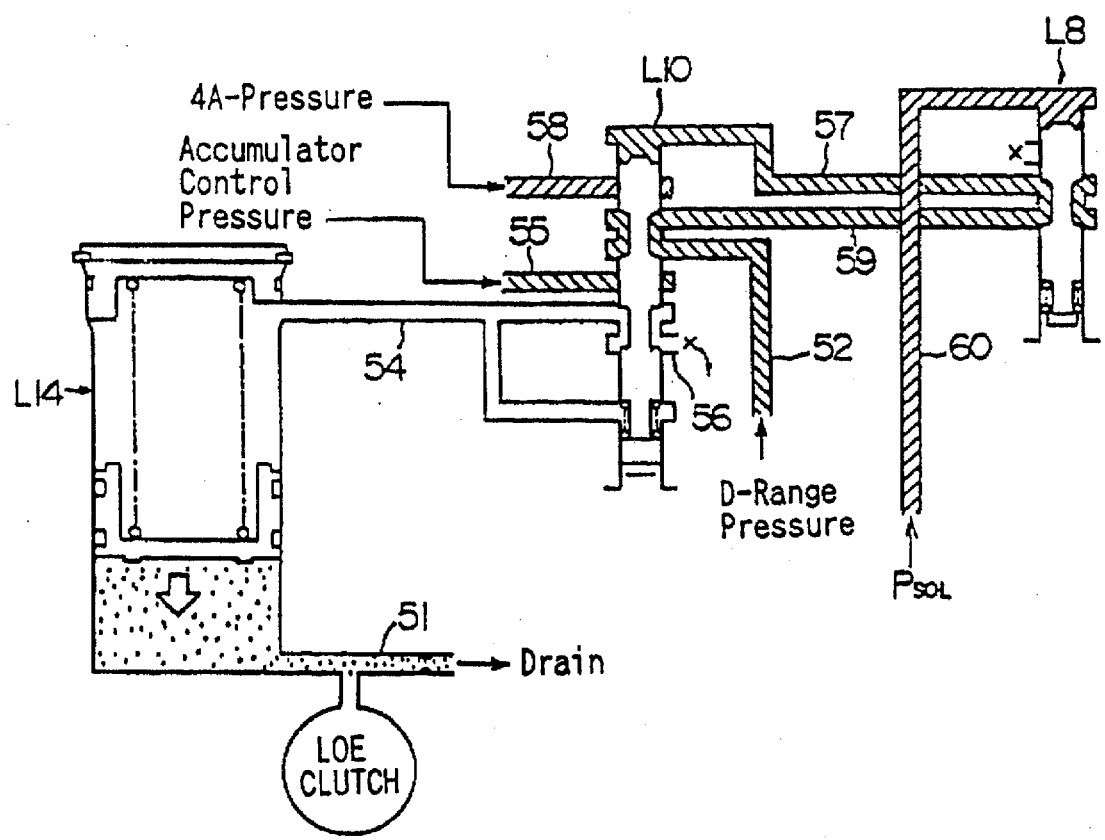
FIG. 12 is a view explaining an operation of the hydraulic control device of the first embodiment when the transmission is shifted up from the 3rd-speed to 4th-speed gear position.

FIG. 12 is a view explaining the operation of the present hydraulic control device upon shifting-up from the 3rd-speed to 4th-speed gear position. A hatched portion in the figure indicates that the oil pressure is generated, and a dotted portion indicates that the oil pressure is eliminated.

Although the low clutch pressure is drained when the shift-up action from the 3rd-speed to 4th-speed gear position is initiated, the low clutch LOW/C remains engaged due to the accumulator pressure of the low clutch accumulator L14.

When the shift-up action is started, the 4A pressure for engaging the band brake B/B is increased, and starts acting on an end portion of the spool 10a of the low clutch sequence valve 10 in the state of FIG. 11, through the oil paths 58, 59 and 57. When the 4A pressure that is gradually increased with the lapse of time reaches a predetermined pressure (corresponding to an accumulat or control pressure), the spool 10a is pushed downward in FIG. 12, and the oil path communicating with the accumulator back pressure oil path 54 is disconnected from the accumulator control pressure oil path 55, and brought into communication with the drain oil path 56. As a result, the oil in the accumulator back pressure chamber 14d is drained, as shown in FIG. 12.

With the accumulator back pressure drained, the accumulator pressure of the low clutch accumulator L14 (i.e. the holding force for the low clutch LOW/C) is reduced, whereby the low clutch LOW/C is released, and the band brake B/B is engaged due to the increase in the 4A pressure.

Although the 4A pressure is generated in the 4th-speed gear position, the oil path 59 communicates with the oil path 52 as the spool 10a of the low clutch sequence valve L10 is shifted downward, and a D range pressure other than the 4A pressure is applied to the end portion of the spool 10a of the low clutch sequence valve L10. Thus, the accumulator back pressure oil path 54 is kept in communication with the drain oil path 56.

When the transmission is shifted down from the 4th-speed to 3rd-speed gear position, the low clutch pressure is generated, but the low clutch LOW/C remains unengaged since the back pressure of the low clutch accumulator L14 is kept drained, and therefore the accumulator pressure is held at a low level.

Although the 4A pressure is lowered when the shift-down action from the 4th-speed to 3rd-speed gear position is initiated, the accumulator back pressure is kept drained irrespective of the level of the 4A pressure, since the operating signal pressure of the low clutch sequence valve L10 is switched from the 4A pressure to the D-range pressure, as explained above with respect to the 4th-speed gear position.

With the low clutch LOW/C held in its released position, the powertrain is held in a neutral condition, and the engine may suffer from racing due to a reduced load.

In view of the above, the shift-down timing control as described above is implemented. Initially, the timing solenoid 43 receives an OFF command, that is, the solenoid 43 is turned off, at a point of time when the gear ratio becomes equal to or smaller than a predetermined valve, so that the solenoid pressure $P_{SOL}$ is drained. As a result, in the low clutch timing valve L8, the oil path 57 is brought into communication with the drain port 8d, so that the oil in the oil path 57 is drained. Consequently, the spool 10a of the low clutch sequence valve L10 is shifted upward in the figure, and the accumulator back pressure oil path 54 is disconnected from the drain oil path 56, and is brought into communication with the accumulator control pressure oil path 55. Thus, the oil pressure in the accumulator back pressure chamber 14d is increased.

Due to the increase in the accumulator back pressure, the accumulator pressure of the low clutch accumulator L14 is increased, the low clutch LOW/C is engaged, and the band brake B/B is released due to the reduction of the 4A pressure.

It will be understood from the above that the timing of engagement of the low clutch LOW/C is not related with the 4A pressure, but determined only depending upon the point of time when the solenoid pressure $P_{SOL}$ is drained.

The 3rd-speed gear position after the shift-down action is established by generating an ON command to the timing solenoid 43 upon detecting termination of the shifting action. Thus, the transmission is returned to the same 3rd-speed gear position as described above.

Upon shifting-up from the 3rd-speed to 4th-speed position, the shifting timing is controlled by the 4A pressure, since a high quality of shift-up operation can be achieved due to control of the timing by means of the engaging capacity or pressure. Thus, the 4A pressure is used by the low clutch sequence valve L10 as the operating signal pressure needed for controlling the timing of the shift-up action.

Upon shifting-down from the 4th-speed to 3rd-speed gear position, on the other hand, the shifting timing cannot be controlled by the engaging capacity or pressure, but must be controlled by rotation or change gear ratio. Accordingly, if the hydraulic control device is constructed such that the 4A pressure has an influence on control of the shift-down timing, the shift-down action may not be well timed, as described above with respect to the conventional device. This also makes it impossible to eliminate or reduce the size of the 4A accumulator.

In the present embodiment of the invention, therefore, the D range pressure other than the 4A pressure is applied to the low clutch sequence valve L10 in the 4th-speed gear position before the shift-down action, and only the solenoid pressure $P_{SOL}$ is used as the operating signal pressure during the shift-down action, while the feed-back pressure is used as the operating signal pressure in the 3rd-speed gear position after the shift-down action. Thus, the present hydraulic control device is adapted such that the 4A pressure is not used except for the shift-up action. Accordingly, the timing of the shift-down action can be appropriately controlled without being affected by the 4A pressure, and the 3-4 accumulator L3 can be significantly small-sized due to the absence of influences by the 4A pressure.

In the hydraulic control device for the automatic transmission in which the shift-down timing is controlled by regulating the accumulator back pressure of the low clutch LOW/C that is engaged in low-speed (1st-speed to 3rd-speed in the D range) gear positions, the switch control means for communicating the accumulator back pressure oil path 54 communicating with the back pressure chamber 14d of the low clutch accumulator L14, with a selected one of the accumulator control pressure 0i path 55 and the drain oil path 56 is constituted by the low clutch timing valve L8 that operates in response to the solenoid pressure $P_{SOL}$ as the operating signal pressure, and the low clutch sequence valve L10 to which the feed-back pressure is applied and in which the valve operating signal pressure is changed by the low clutch timing valve L8.

In the 3rd-speed gear position, the accumulator back pressure oil path 54 is held in communication with the accumulator control pressure oil path 55 due to the feed-back pressure, and, upon shifting-up from the 3rd-speed to 4th-speed gear position, the same oil path 54 is brought into communication with the drain oil path 56, using the 4A pressure as the operating signal pressure. In the 4th-speed gear position, the accumulator back pressure oil path 54 is kept in communication with the drain oil path 56 due to the force of other D range pressure, and, upon shifting-down from the 4th-speed to 3rd-speed gear position, the same oil path 54 is brought into communication with the accumulator control pressure oil path 55, using only the solenoid pressure $P_{SOL}$ as the operating signal pressure. By changing the vale operating signal pressure of the low clutch sequence valve L10 by means of the low clutch timing valve L8, the timing of the shift-down action from the 4th-speed to 3rd-speed gear position can be optimally controlled, and the 3-4 accumulator L3 for the band brake B/B that is engaged in the 4th-speed gear position can be significantly reduced in size.

Figure 13:
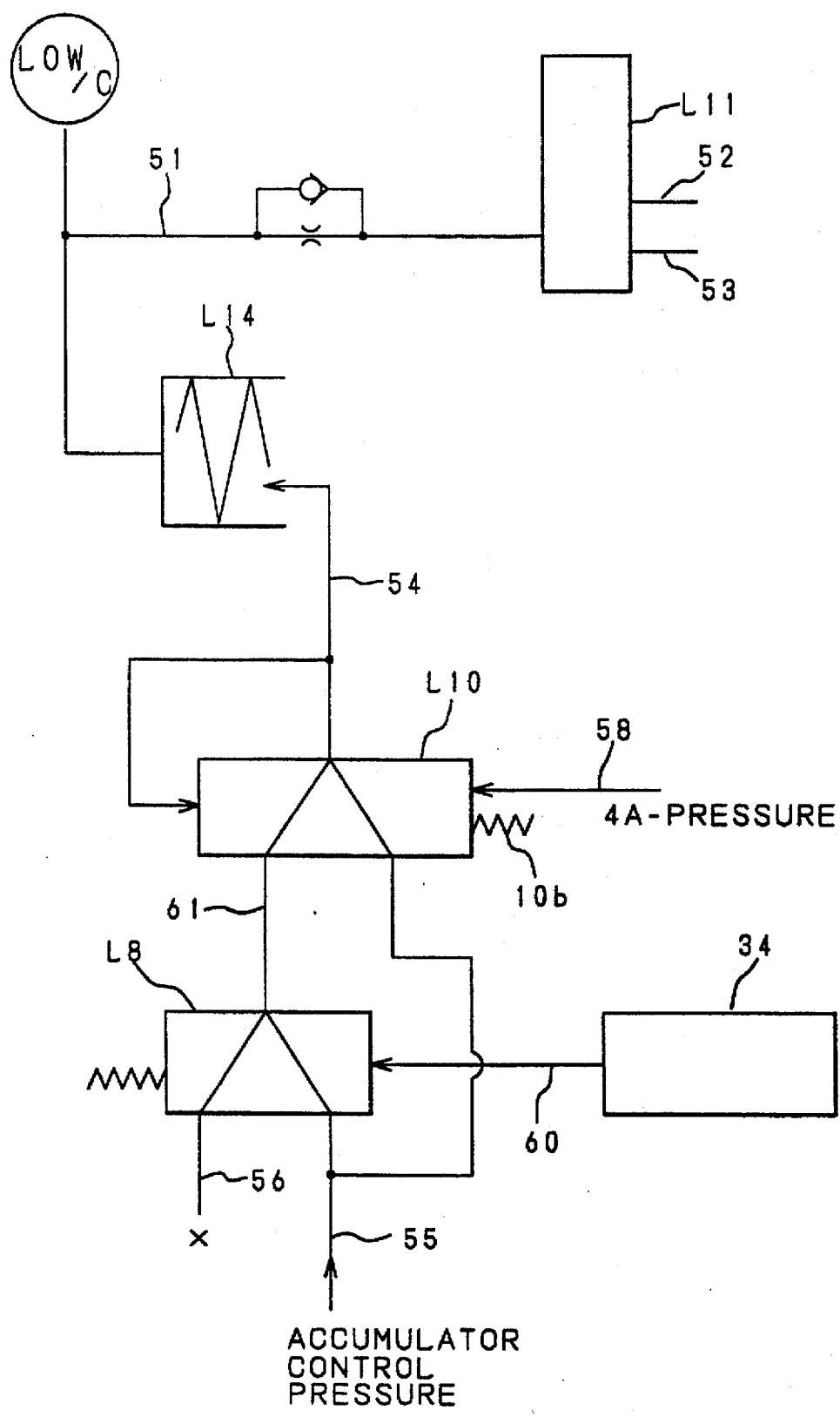
FIG. 13 is a view showing a hydraulic circuit diagram of the second embodiment of the invention.

FIG. 13 is a hydraulic circuit diagram showing the second embodiment of the present invention.

In FIG. 13, LOW/C is a low clutch (corresponding to the N-speed gear engaging element c), L11 is a shift valve B (corresponding to the shift valve a), L14 is a low clutch accumulator (corresponding to the accumulator b), L8 is a low clutch timing valve (corresponding to the engaging element timing valve), L10 is a low clutch sequence valve (corresponding to the engaging element sequence valve), and 34 is a timing solenoid. The combination of the low clutch timing valve L8 and low clutch sequence valve L10 corresponds to the switch control means g.

The low clutch sequence valve L10 serves to communicate the accumulator back pressure oil path 54 communicating with the accumulator back pressure chamber 14d, with a selected one of the accumulator control pressure oil path 55 and an input pressure oil path 61. This valve L10 is different from the low clutch sequence valve L10 of the first embodiment in that a spring 10b is provided for biasing the spool 10a of the valve L10 to the left as seen in FIG. 13 to face the feed-back pressure, and that a reduced number of ports are provided.

The low clutch timing valve L8 operates in response to a solenoid pressure as an operating signal pressure, and serves to communicate the input pressure oil path 61 of the low clutch sequence valve L10 with a selected one of the accumulator control pressure oil path 55 and the drain oil path 56. In this respect, this valve L8 is different from the low clutch timing valve L8 of the first embodiment.

The other structure of the hydraulic control device of the second embodiment is identical with that of the first embodiment, and therefore will not be explained.

In the device of the second embodiment, the input pressure of the low clutch sequence valve L10 is switched or changed by the low clutch timing valve L8. In this respect, the operation of the present embodiment is different from that of the hydraulic control device of the first embodiment in which the operating signal pressure of the low clutch sequence valve L10 is switched or changed by the low clutch timing valve L8.

In the device of the first embodiment, the D range pressure is used for retaining the position of the spool 10a of the low clutch sequence valve L10 in the 4th-speed gear position. In the device of the second embodiment, on the other hand, the force due to the spring 10b is used for retaining the position of the spool 10a of the low clutch sequence valve L10 in the 4th-speed gear position.

In the hydraulic control device for the automatic transmission according to the second embodiment in which the shift-down timing is controlled by regulating the accumulator back pressure for the low clutch LOW/C that is engaged in low-speed (1st-speed to 3rd-speed in the D range) gear positions, the switch control means for communicating the accumulator back pressure oil path 54 communicating with the back pressure chamber 14d of the low clutch accumulator L14, with a selected one of the accumulator control pressure oil path 55 and the drain oil path 56 is constituted by the low clutch timing valve L8 that operates in response to the solenoid pressure $P_{SOL}$ as the operating signal pressure, and the low clutch sequence valve L10 to which the feed-back pressure is applied and in which the input pressure is changed by the low clutch timing valve L8.

In the 3rd-speed gear position, the accumulator back pressure oil path 54 is held in communication with the accumulator control pressure oil path 55 due to the feed-back pressure, and, upon shifting-up from the 3rd-speed to 4th-speed gear position, the same oil path 54 is brought into communication with the drain oil path 56, using the 4A pressure as the operating signal pressure. In the 4th-speed gear position, the accumulator back pressure oil path 54 is kept in communication with the drain oil path 56 due to the bias force of the spring 10b, and, upon shifting-down from the 4th-speed to 3rd-speed gear position, the same oil path 54 is brought into communication with the accumulator control pressure oil path 55, using only the solenoid pressure $P_{SOL}$ as the operating signal pressure. By changing the input pressure of the low clutch sequence valve L10 by means of the low clutch timing valve L8, the timing of the shift-down action from the 4th-speed to 3rd-speed gear position can be optimally controlled, and the 3-4 accumulator L3 for the band brake B/B that is engaged in the 4th-speed gear position can be significantly reduced in size.

Figure 14:
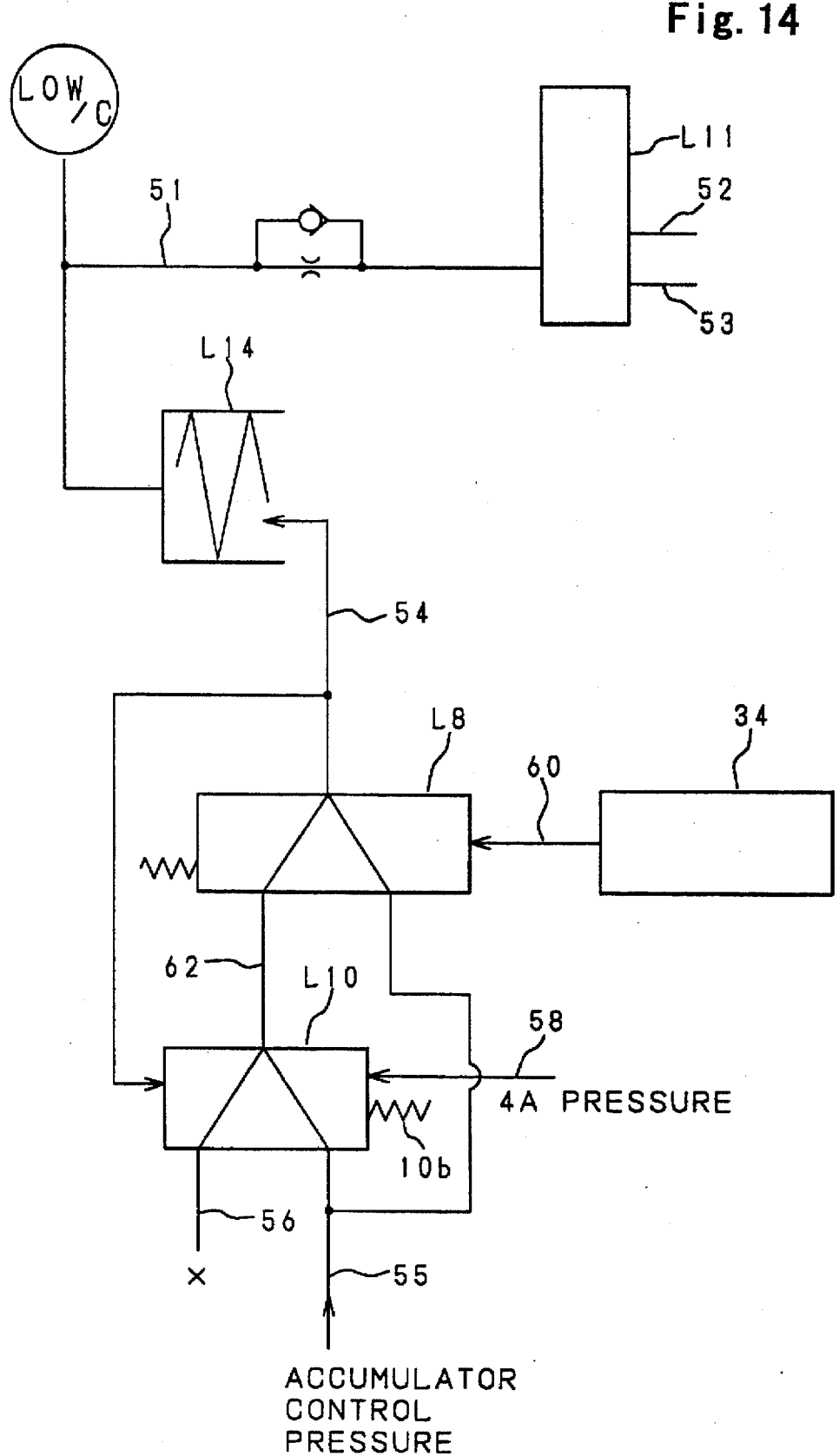
FIG. 14 is a view showing a hydraulic circuit diagram of the third embodiment of the invention.

FIG. 14 is a hydraulic circuit diagram showing the third embodiment of the present invention. In FIG. 14, LOW/C is a low clutch (corresponding to the N-speed gear engaging element c), L11 is a shift valve B (corresponding to the shift valve a), L14 is a low clutch accumulator (corresponding to the accumulator b), L8 is a low clutch timing valve (corresponding to the engaging element timing valve), L10 is a low clutch sequence valve (corresponding to the engaging element sequence valve), and 34 is a timing solenoid. The combination of the low clutch timing valve L8 and low clutch sequence valve L10 corresponds to the switch control means g.

The low clutch sequence valve L10 serves to communicate the output pressure oil path 62 connected to the low clutch timing valve L8, with a selected one of the accumulator control pressure oil path 55 and the drain oil path 56. This valve L10 is different from the low clutch sequence valve L10 of the first embodiment in that a spring 10b is provided for biasing the spool 10a of the valve L10 to the left as seen in FIG. 14 to face the feed-back pressure, and that a reduced number of ports are provided.

The low clutch timing valve L8 operates in response to a solenoid pressure as an operating signal pressure, and serves to communicate the accumulator back pressure oil path 54 communicating with the accumulator back pressure chamber 14d, with a selected one of the output pressure oil path 62 and the accumulator control pressure oil path 55. In this respect, this valve L8 is different from the low clutch timing valve L8 of the first embodiment.

The other structure of the hydraulic control device of the third embodiment is identical with that of the first embodiment, and therefore will not be explained.

In the device of the third embodiment, the output pressure of the low clutch sequence valve L10 is changed by the low clutch timing valve L8. In this respect, the operation of the present embodiment is different from that of the hydraulic control device of the first embodiment in which the operating signal pressure of the low clutch sequence valve L10 is changed by the low clutch timing valve L8.

In the device of the first embodiment, the D range pressure is used for retaining the position of the spool 10a of the low clutch sequence valve L10 in the 4th-speed gear position. In the device of the third embodiment, on the other hand, the force due to the spring 10b is used for retaining the position of the spool 10a of the low clutch sequence valve L10.

In the hydraulic control device for the automatic transmission according to the third embodiment in which the shift-down timing is controlled by regulating the accumulator back pressure for the low clutch LOW/C that is engaged in low-speed (1st-speed to 3rd-speed in the D range) gear positions, the switch control means for communicating the accumulator back pressure oil path 54 communicating with the back pressure chamber 14d of the low clutch accumulator L14, with a selected one of the accumulator control pressure oil path 55 and the drain oil path 56 is constituted by the low clutch timing valve L8 that operates in response to the solenoid pressure $P_{SOL}$ as the operating signal pressure, and the low clutch sequence valve L10 to which the feed-back pressure is applied and in which the output pressure is changed by the low clutch timing valve L8.

In the 3rd-speed gear position, the accumulator back pressure oil path 54 is held in communication with the accumulator control pressure oil path 55 due to the feed-back pressure, and, upon shifting-up from the 3rd-speed to 4th-speed gear position, the same oil path 54 is brought into communication with the drain oil path 56, using the 4A pressure as the operating signal pressure. In the 4th-speed gear position, the accumulator back pressure oil path 54 is kept in communication with the drain oil path 56 due to the bias force of the spring 10b, and, upon shifting-down from the 4th-speed to 3rd-speed gear position, the same oil path 54 is brought into communication with the accumulator control pressure oil path 55, using only the solenoid pressure $P_{SOL}$ as the operating signal pressure. By changing the output pressure of the low clutch sequence valve L10 by means of the low clutch timing valve L8, the timing of the shift-down action from the 4th-speed to 3rd-speed gear position can be optimally controlled, and the 3-4 accumulator L3 of the band brake B/B that is engaged in the 4th-speed gear position can be significantly reduced in size.

While the preferred embodiments have been described referring to the drawings, the present invention is not limited to details of the illustrated embodiments, but may be embodied with various changes and additions.

In the illustrated embodiments, the switch control means is constituted by two valves, i.e., the low clutch timing valve L8 that operates in response to the solenoid pressure $P_{SOL}$ as an operating signal pressure, and the low clutch sequence valve L10 to which the feed-back pressure is applied and in which the output pressure is changed by the low clutch timing valve L8. The switch control means, however, may be a single-valve structure, rather than the above dual-valve structure, as long as the output oil communicating with the accumulator back pressure chamber can be connected to a selected one of the two oil paths, using the N+1 pressure, solenoid pressure and output feed-back pressure as operating signal pressures.

While the 3-4 accumulator L3 of a reduced size is employed for smoothly engaging the band brake B/B upon shifting-up from the 3rd-speed to 4th-speed gear position in the illustrated embodiments, the 3-4 accumulator L3 may be eliminated.

What is claimed is:

1. A hydraulic control device for an automatic transmission, comprising:

an N-speed gear engaging element that is engaged when an N-speed gear position is established, and is released when an N+1-speed gear position is established;

an accumulator disposed in a middle of an oil path that communicates said N-speed gear engaging element with a shift valve;

switch control means for communicating an output oil path communicating with a back pressure chamber of said accumulator, with a selected one of an accumulator control pressure oil path and a drain oil path;

a timing solenoid for controlling said switch control means by applying thereto a solenoid pressure as an operating signal pressure, synchronously with an engaging timing of the N-speed gear engaging element when the N+1-speed gear position is shifted down to the N-speed gear position; and an N+1-speed pressure oil path for controlling said switch control means by applying thereto as an operating signal pressure an N+1 pressure applied to an N+1-speed engaging element that is engaged in the N+1-speed gear position; and wherein the operating signal pressure to be applied to said switch control means is selected from said solenoid pressure, said N+1 pressure and an output feed-back pressure from said output oil path, and wherein said switch control means maintains communication between the output oil path and the accumulator control pressure oil path due to the output feed-back pressure in the N-speed gear position, and brings the output oil path into communication with the drain oil path, using the N+1 pressure as the operating signal pressure, upon shifting-up from the N-speed to N+1-speed gear position, said switch control means maintaining communication between the output oil path and the drain oil path due to a force other than the N+1 pressure in the N+1-speed gear position, and bringing the output oil path into communication with the accumulator control pressure oil path, using only the solenoid pressure as the operating signal pressure, upon shifting-down from the N+1-speed to N-speed gear position.

2. A hydraulic control device for an automatic transmission as defined in claim 1, wherein said switch control means comprises an engaging element timing valve which operates in response to said solenoid pressure as the operating signal pressure, and an engaging element sequence valve to which the output feed-back pressure is applied, and which operates in response to a valve operating signal pressure that is changed by said engaging element timing valve.

3. A hydraulic control device for an automatic transmission as defined in claim 1, wherein said switch control means comprises an engaging element timing valve which operates in response to said solenoid pressure as the operating signal pressure, and an engaging element sequence valve to which the output feed-back pressure is applied, and which receives an input pressure that is changed by said engaging element timing valve.

4. A hydraulic control device for an automatic transmission as defined in claim 1, wherein said switch control means comprises an engaging element timing valve which operates in response to said solenoid pressure as the operating signal pressure, and an engaging element sequence valve to which the output feed-back pressure is applied, and which generates an output pressure that is changed by said engaging element timing valve.

* * * * *